(12) United States Patent
Ma et al.

(10) Patent No.: US 12,462,826 B2
(45) Date of Patent: Nov. 4, 2025

(54) ADAPTING SIBILANCE DETECTION BASED ON DETECTING SPECIFIC SOUNDS IN AN AUDIO SIGNAL

(71) Applicant: Dolby Laboratories Licensing Corporation, San Francisco, CA (US)

(72) Inventors: Yuanxing Ma, Beijing (CN); Kai Li, Beijing (CN); Qianqian Fang, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 531 days.

(21) Appl. No.: 17/627,116

(22) PCT Filed: Jul. 16, 2020

(86) PCT No.: PCT/US2020/042400
§ 371 (c)(1),
(2) Date: Jan. 13, 2022

(87) PCT Pub. No.: WO2021/011814
PCT Pub. Date: Jan. 21, 2021

(65) Prior Publication Data
US 2022/0383889 A1      Dec. 1, 2022

Related U.S. Application Data

(60) Provisional application No. 62/884,320, filed on Aug. 8, 2019.

(30) Foreign Application Priority Data

Jul. 17, 2019   (WO) ................ PCT/CN2019/096399

(51) Int. Cl.
*G10L 21/0216*     (2013.01)
*G10L 25/18*       (2013.01)

(52) U.S. Cl.
CPC .......... *G10L 21/0216* (2013.01); *G10L 25/18* (2013.01)

(58) Field of Classification Search
None
See application file for complete search history.

(56) References Cited

U.S. PATENT DOCUMENTS

| 5,548,642 A | 8/1996 | Diethorn |
| 6,373,953 B1 | 4/2002 | Flaks |
| (Continued) | | |

FOREIGN PATENT DOCUMENTS

| EP | 3261089 A1 | 12/2017 |
| EP | 3261089 B1 | 4/2019 |
| (Continued) | | |

OTHER PUBLICATIONS

Abdelatty Ali Ahmed M et al: "Acoustic-phonetic features for the automatic classification of fricatives", The Journal of the Acoustical Society of Amer i ca, American Institute of Physics for the Acoustical Society of Amer i ca, New York, NY, US, vol. 109, No. 5, May 1, 2001 (May 1, 2001), pp. 2217-2235.

(Continued)

*Primary Examiner* — Nicole A K Schmieder

(57) ABSTRACT

A method is disclosed herein for adapting parameters of a sibilance detector. Time-frequency features are extracted from an audio signal being received and. Based on those time-frequency features, a determination is made of whether the audio signal includes a short-term feature or a long-term feature. In accordance with determining that the audio signal includes the short-term feature or the long-term feature, one or more parameters of a sibilance detector for detecting sibilance in the audio signal are adapted. Sibilance in the audio signal, is detected using the sibilance detector with the one or more adapted parameters.

20 Claims, 7 Drawing Sheets

(56) References Cited

U.S. PATENT DOCUMENTS

| | | | |
|---|---|---|---|
| 7,353,169 B1 * | 4/2008 | Goodwin | G10L 19/025 |
| | | | 704/224 |
| 8,195,472 B2 | 6/2012 | Crockett | |
| 8,788,265 B2 | 7/2014 | Laaksonen | |
| 8,965,770 B2 | 2/2015 | Petrushin | |
| 9,135,905 B2 | 9/2015 | Moraes | |
| 9,275,648 B2 | 3/2016 | Lee | |
| 9,584,946 B1 | 2/2017 | Lyren | |
| 9,640,193 B2 | 5/2017 | Kong | |
| 9,779,721 B2 | 10/2017 | Donjon | |
| 9,870,719 B1 * | 1/2018 | Watkins | G10L 25/21 |
| 9,905,208 B1 | 2/2018 | Peterik | |
| 10,026,282 B2 | 7/2018 | Nye | |
| 2010/0114583 A1 | 5/2010 | Lee | |
| 2014/0177853 A1 | 6/2014 | Toyama | |
| 2016/0344356 A1 * | 11/2016 | Grosche | H03G 11/008 |
| 2017/0372719 A1 | 12/2017 | Li | |
| 2018/0295240 A1 | 10/2018 | Dickins | |
| 2019/0156855 A1 | 5/2019 | Herbig | |
| 2020/0321019 A1 | 10/2020 | Cengarle | |

FOREIGN PATENT DOCUMENTS

| | | |
|---|---|---|
| JP | 2001013988 A | 1/2001 |
| JP | 2001067092 A | 3/2001 |
| WO | 2004109661 A1 | 12/2004 |
| WO | 2012097150 A1 | 7/2012 |
| WO | 2016086633 A1 | 6/2016 |
| WO | 2018097620 A1 | 5/2018 |

OTHER PUBLICATIONS

Pulakka H et al: Evaluation of an Artificial Speech Bandwidth Extension Method in Three Languages11 , IEEE Transactions on Audio, Speech and Language Processing, IEEE, US, vol. 16, No. 6, Aug. 1, 2008.

* cited by examiner

ADAPTING SIBILANCE DETECTION BASED ON DETECTING SPECIFIC SOUNDS IN AN AUDIO SIGNAL

CROSS REFERENCE TO RELATED APPLICATION

This application claims priority to U.S. Provisional Application No. 62/884,320, filed Aug. 8, 2019 and International Application No. PCT/CN2019/096399, filed Jul. 17, 2019, each of which is incorporated by reference in its entirety.

TECHNOLOGY

Embodiments of the present disclosure generally relate to audio signal processing, and more specifically, to adaptation of sibilance detection.

BACKGROUND

In phonetics, sibilance refers to speech having strongly emphasized fricative consonants (e.g., s, sh, ch, z, v, and f). These consonants are created when air moving through the vocal tract is constricted by the position of the tongue and lips. Sibilance in an audio signal normally lies in the frequency range of 4 kHz ("kilohertz") to 12 kHz, depending on the individual speaking. If the energy of the sibilance is high, the speech will have an unnatural harshness that will degrade the quality of the audio signal and be annoying to a listener.

SUMMARY

The disclosed embodiments detect short-term features and long-term features in an audio signal and adapt sibilance detection to avoid mistaking the features for excessive sibilance in the audio signal. An advantage of the disclosed systems and methods is that the quality of the audio signal is preserved by not suppressing the short-term or long-term features which may be a desirable part of the audio content. The disclosed systems and methods are especially useful for low-fidelity devices, such as low-quality headsets that have a poor microphone frequency response for high frequencies or mobile devices that have low-quality speakers.

In some aspects, the present disclosure describes a method for adapting sibilance parameters and using the adapted sibilance parameters in sibilance detection. A system receives an audio signal (e.g., a movie soundtrack, music, user-generated audio, or a podcast) and extracts from the audio signal a plurality of time-frequency features (e.g., energy data for a plurality of frequency bands), the time-frequency features including short-term features, such as impulsive sounds (e.g., a gunshot sound) and/or flat fricative sounds (e.g., a letter "f" sound), and/or long-term features, such as a smoothed spectrum balance feature. In accordance with determining that the input signal includes short-term and/or long-term features, the system adapts one or more parameters of a sibilance detector for detecting sibilance in the audio signal. Using the sibilance detector with the one or more adapted parameters, the system proceeds to detect sibilance in the audio signal and suppress the sibilance using a multiband compressor, or use the detected sibilance for any other desired application. In an embodiment, the sibilance detector is implemented using a supervised or unsupervised machine learning-based classifier (e.g., a neural network) that is trained on audio samples with one or more short-term and/or long-term features.

These and other aspects, features, and embodiments can be expressed as methods, apparatus, systems, components, program products, means or steps for performing a function, and in other ways.

These and other aspects, features, and embodiments will become apparent from the following descriptions, including the claims.

BRIEF DESCRIPTION OF THE DRAWINGS

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

DETAILED DESCRIPTION

In the following description, for the purposes of explanation, numerous specific details are set forth to provide a thorough understanding of the present disclosure. It will be apparent, however, that the present disclosure may be practiced without these specific details.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on."

Figure 1A:
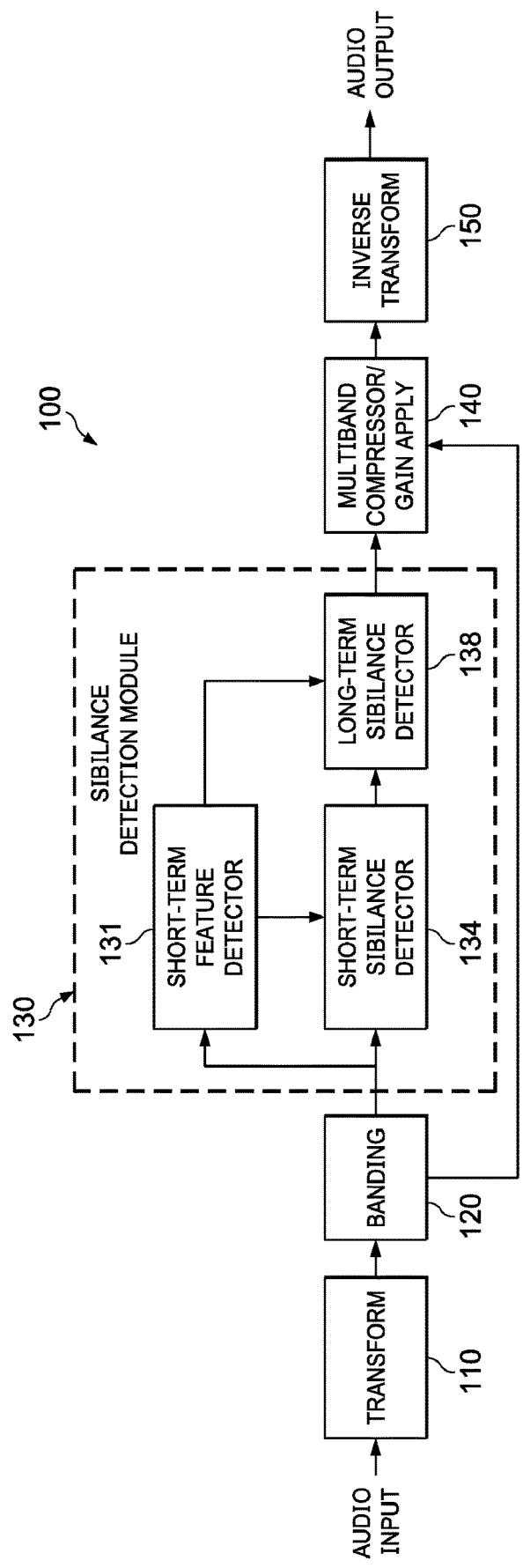
FIG. 1A is a block diagram of a system for adapting parameters for sibilance detection, in accordance with some embodiments of the present disclosure.
Figure 1B:
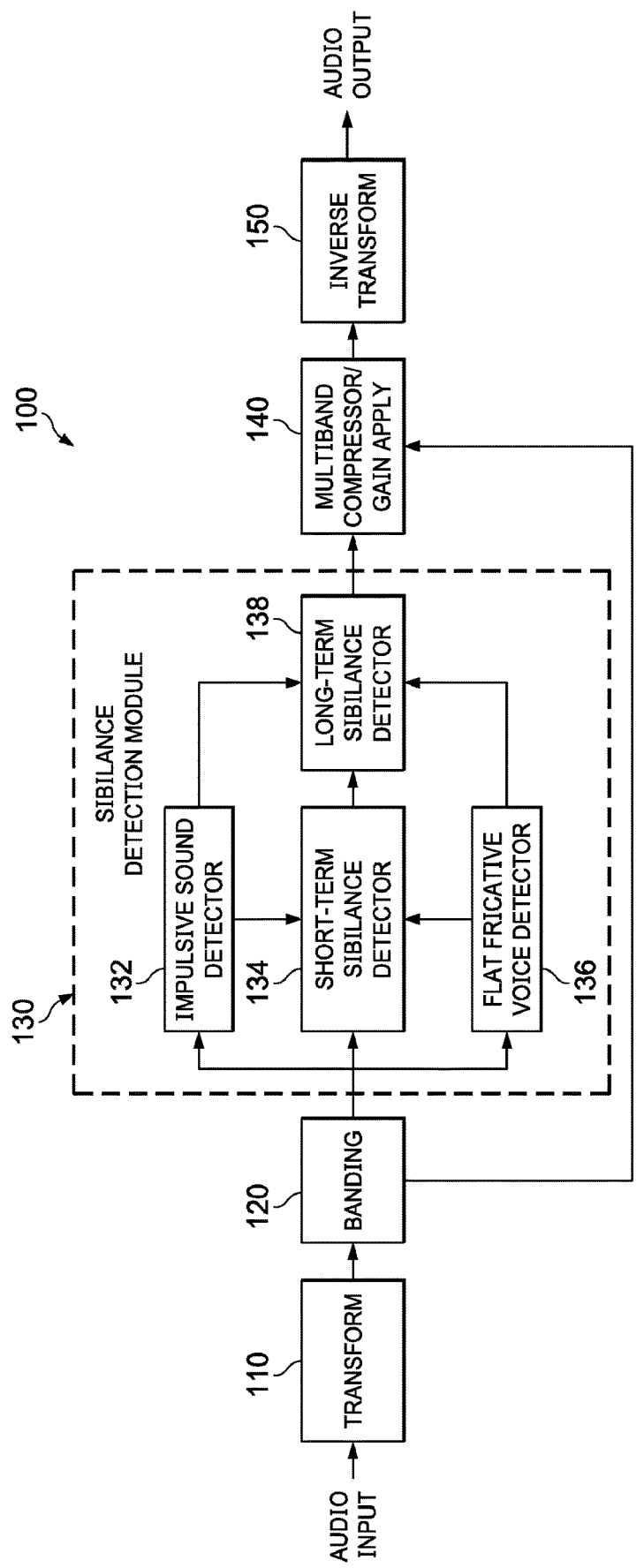
FIG. 1B is a block diagram of a system for adapting parameters for sibilance detection that includes an impulse sound detector and flat fricative sound detector, in accordance with some embodiments of the present disclosure.

FIG. 1A and FIG. 1B are block diagrams of a system 100 for adapting parameters for detecting sibilance, in accordance with some embodiments of the present disclosure. The system 100 includes a transform module 110, a banding module 120, a sibilance detection module 130, a multiband compressor 140, and an inverse transform module 150. FIG. 1A includes a short-term feature detector 131 used to detect short-term features in audio signals. In some embodiments, short-term features include the detection of instantaneous sounds like a strike of percussion instruments or a gunshot. Those sounds are generally of a short duration, sometimes around five milliseconds. FIG. 1B includes two examples of short-term feature detectors. Impulsive sound detector 132 is used to detect impulsive sounds like gunshots a strike of percussion instruments like cymbals, while flat fricative voice detector 136 is used to detect flat fricative sounds (e.g., the letter v sound, the letter t sound, the letter f sound, or "th" sound). In some embodiments, the impulsive sound detector 132 and the flat fricative voice detector 136 are combined into a single detector module.

The transform module 110 is configured to receive an audio signal and transform the audio signal to a desired transform domain. In some embodiments, the audio signal includes speech and non-speech sounds. To perform sibilance parameter adaptation, the transform module 110 performs a transform operation (e.g., using a filterbank) on frames of the audio signal to transform the audio signal into a plurality of bands of spectral features in the frequency domain. For example, the transform module 110 may perform a Fast Fourier Transform (FFT), a Modified Discrete Cosine Transform (MDCT), a Quadrature Mirror Filter (QMF) or another transform algorithm to transform the audio signal from the time domain to the frequency domain or a time-frequency domain. In some embodiments, the transform module outputs a plurality of equidistantly-spaced frequency bins.

The banding module 120 performs a banding operation that groups or aggregates the output of the transform module 110 (e.g., frequency bins generated by the transform module 110) into a plurality of frequency bands (e.g., Equivalent Rectangular Bandwidth ("ERB") bands). In some embodiments, Third Octave Filter Banks are used in the banding module. The frequency bands include sibilance frequency bands (e.g., from about 4 kHz to about 12 kHz) and non-sibilance frequency bands (e.g., below 4 kHz and from about 12 kHz to about 16 kHz). In an embodiment, the sibilance detection module 130 includes a short-term feature detector 131, a short-term sibilance detector 134 and a long-term sibilance detector for 136, as shown in FIG. 1A. The sibilance detection module 130 and its components will be discussed in greater detail further in this disclosure. The multiband compressor 140 modifies gains applied to the sibilance bands and/or non-sibilance bands according to the output of the sibilance detection module 130. In some embodiments, the gain on a specific band is mapped to a gain to be applied on a subset of the frequency bins output by the transform module (110). After the gain is applied, the frequency bands are input into the inverse transform module 150 where the frequency bands are transformed back to the time domain. The time domain audio signal is then sent to one or more output devices (e.g., to a speaker system, a storage device).

Actions performed in this disclosure will be described as performed by a sibilance detection module. It should be noted that the sibilance detection module may include software, hardware or a combination of both. Example embodiments of hardware that may be used to implement the system 100 are further described in relation to FIG. 7. Although the example embodiment described below includes impulse sound detection and flat-fricative sound detection to provide short-term features, respectively, the embodiments can use any short-term features detected.

FIG. 1B is a block diagram of a system for adapting parameters for sibilance detection that includes an impulse sound detector and flat fricative sound detector, in accordance with some embodiments of the present disclosure.

Figure 2:
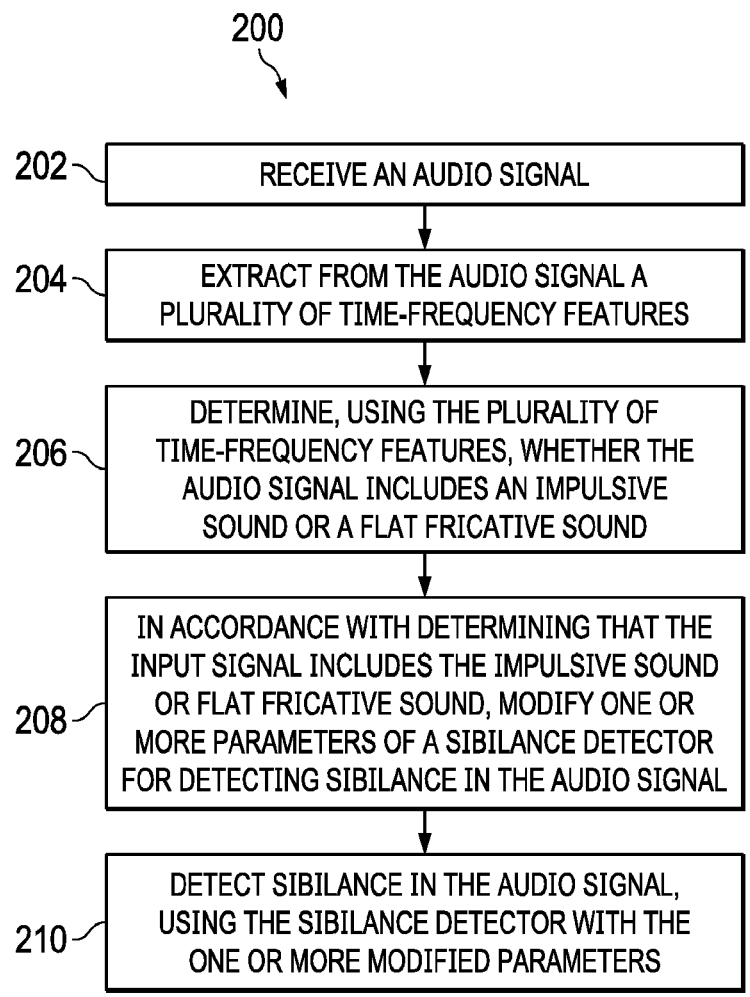
FIG. 2 illustrates actions for adapting parameters used in sibilance detection, in accordance with some embodiments of the present disclosure.

FIG. 2 illustrates actions for adapting parameters used in sibilance detection. At 202, the sibilance detection module 130 receives an audio signal. The audio signal is received and processed through the transform module 110 and the banding module 120. As discussed above, the transform module 110 transforms the audio signal from the time-domain into the frequency domain and the banding module 120 groups or aggregates output of the transform module 110 into a plurality of frequency bands including sibilance frequency bands and non-sibilance frequency bands.

At 204, the sibilance detection module 130 extracts from the audio signal a plurality of time-frequency features. Those features include energy levels for each bands in the sibilance frequency bands for a particular frame of the audio signal. At 206, the sibilance detection module 130 determines, using the plurality of time-frequency features, whether the audio signal includes an impulsive sound or a flat fricative sound. The sibilance detection module 130 is configured to detect impulsive sounds and flat fricative sounds in parallel or serially depending on the resources available to the module.

In the embodiments that include an impulsive sound detector 132, the impulsive sound detector 132 determines whether the audio signal includes an impulsive sound. The impulsive sound detector 132 may include both software and hardware components. In some embodiments, short-term time-frequency features (e.g., ~5 milliseconds) are used to detect an impulsive sound.

Figure 3:
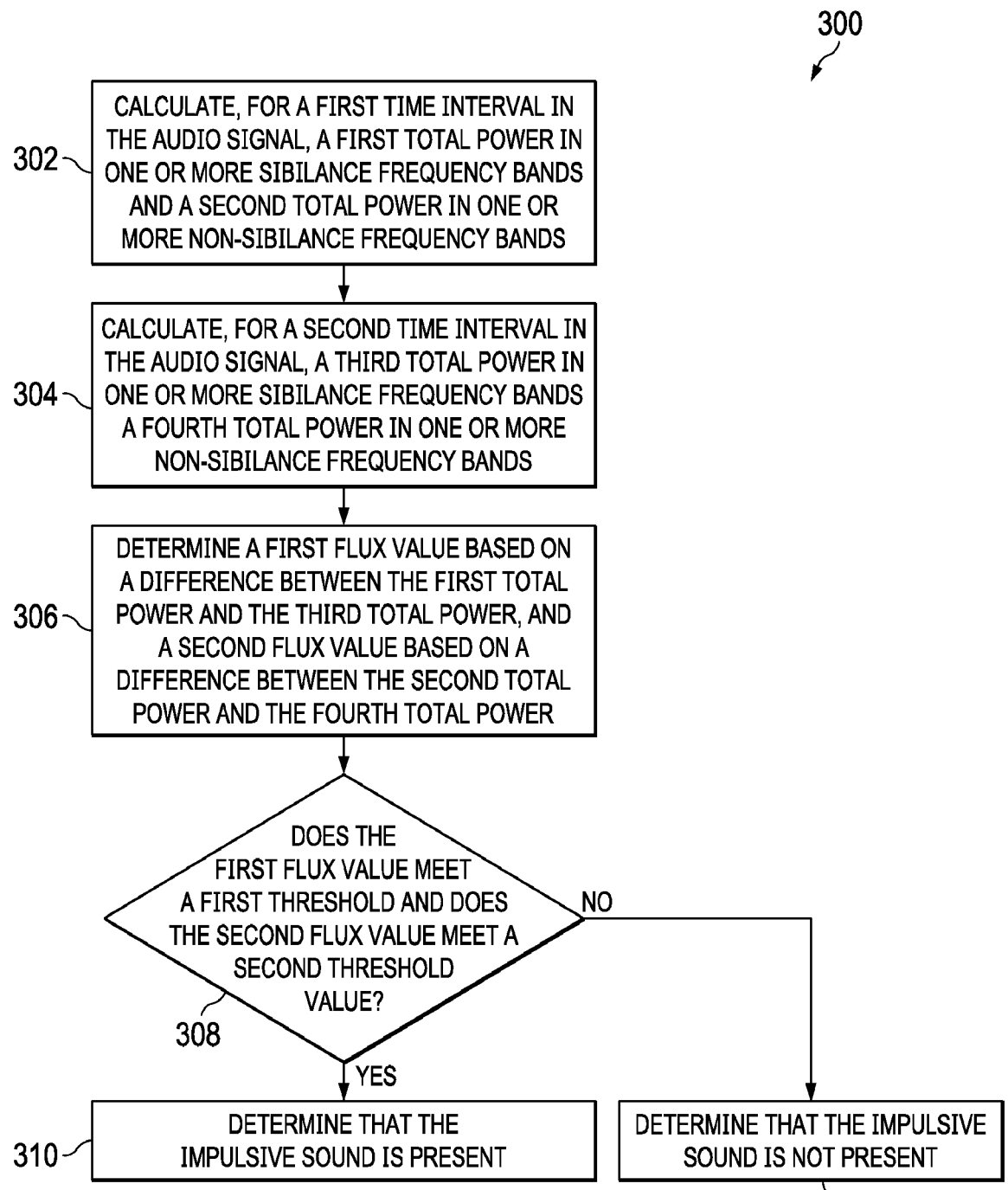
FIG. 3 illustrates actions that the sibilance detection module performs to detect an impulsive sound, in accordance with some embodiments of the present disclosure.

FIG. 3 illustrates actions that the sibilance detection module 130 performs to detect an impulsive sound. At 302, the sibilance detection module 130 calculates, for a first time interval in the audio signal, a first total power in one or more sibilance frequency bands and a second total power in one or more non-sibilance frequency bands. In an embodiment, the sibilance detection module 120 uses Equation 1 (below) to perform the calculations for sibilance frequency bands:

$$P_{sib\_bands}[n] = \sum_{b} P_b[n], \quad \text{Equation 1}$$

where b is the number of sibilance frequency bands, $P_b$ is the power in the sibilance frequency band b and n is the first time interval (e.g., current frame or current time period). In an embodiment, the sibilance detection module 130 uses Equation 2 (below) to perform the calculations for non-sibilance frequency bands:

$$P_{non\_sib\_bands}[n] = \sum_{b} P_b[n], \quad \text{Equation 2}$$

where b is the number of non-sibilance frequency bands, $P_b$ is the power in the non-sibilance frequency band b and n is the first time interval (e.g., current frame or current time period). As discussed above, the sibilance frequency bands include frequencies between about 4 kHz and about 12 kHz, and the non-sibilance frequency bands include frequencies under about 4 kHz and between about 12 kHz and about 16 kHz.

At 304, the sibilance detection module 130 determines, for a second time interval (e.g., an earlier time interval), a third total power in one or more sibilance frequency bands and a fourth total power in one or more non-sibilance frequency bands. For example, in an embodiment the sibilance detection module 130 uses Equation 3 (below) to perform the calculations for the sibilance frequency bands for a prior time interval (e.g., a prior frame):

$$P_{sib\_bands}[n-k] = \sum_{b} P_b[n-k], \quad \text{Equation 3}$$

where b is the number of sibilance frequency bands, $P_b$ is the power in the sibilance frequency band b, n is the first time interval (e.g., a current frame or time period) and k is an integer that makes [n−k] a prior time interval (e.g., a prior frame). In some embodiments, k is an integer in the range of one and three.

In an embodiment, the sibilance detection module 130 uses Equation 4 (below) to perform the calculations for non-sibilance frequency bands for a prior time interval (e.g., prior frame):

$$P_{non\_sib\_bands}[n-k] = \sum_{b} P_b[n-k], \quad \text{Equation 4}$$

where b is the number of non-sibilance frequency bands, $P_b$ is the power in the non-sibilance frequency bands, n is the first time interval (e.g., a current frame or time period) and k is an integer that makes [n−k] a prior time interval (e.g., a prior frame or time period). In some embodiments, k is an integer in the range of one to three.

At 306, the sibilance detection module 130 determines a first flux value based on a difference between the first total power and the third total power, and a second flux value based on a difference between the second total power and the fourth total power. For example, in an embodiment the sibilance detection module 130 uses Equation 5 (below) to calculate the first flux value:

$$S_{sib\_bands}[n] = P_{sib\_bands}[n] - P_{sib_{bands}}[n-k] \quad \text{Equation 5}$$

where $P_{sib\_bands}[n]$ is the total power for the sibilance frequency bands for time interval n the current time interval or the current frame) and $P_{sib_{bands}}[n-k]$ is the total power for the sibilance frequency bands for a prior time interval [n−k], where k may be an integer between one and three. In some embodiments, k can be a larger integer.

In an embodiment, the sibilance detection module 130 uses Equation 6 (below) to calculate the second flux value:

$$S_{non\_sib\_bands}[n] = P_{non\_sib\_bands}[n] - P_{non\_sib\_bands}[n-k] \quad \text{Equation 6}$$

where $P_{non\_sib\_bands}[n]$ is the total power for non-sibilance frequency bands for time interval n (e.g., the current time interval or the current frame) and $P_{non\_sib\_bands}[n-k]$ is the total power for non-sibilance frequency bands for a prior time interval [n−k], where k is an integer between one and three. In some embodiments, k can be a larger integer.

At 308, the sibilance detection module 130 determines whether the first flux value meets a first threshold value and whether the second flux value meets a second threshold value. If both the first flux value and the second flux value meet their respective threshold values, process 300 moves to 310 where the sibilance detection module 130 determines that the impulsive sound is present. If either the first flux value or the second flux value does not meet its respective threshold value, process 300 moves to 312, where the sibilance detection module 130 determines that the impulsive sound is not present. The logic of Equation 7 (below) exemplifies the determination of whether the impulsive sound is present:

$$I[n] = \begin{cases} 1, & \text{if } S_{sib\_bands}[n] > Th_{sib\_band} \text{ and } S_{non\_sib\_bands}[n] > Th_{non\_sib\_band} \\ 0, & \text{otherwise} \end{cases} \quad \text{Equation 7}$$

where $S_{sib\_bands}[n]$ is a flux value for the sibilance frequency bands for time interval n (e.g., current frame), $Th_{sib\_band}$ is a threshold value for the sibilance frequency bands, $S_{non\_sib\_bands}[n]$ is the flux value for the non-sibilance frequency bands and $Th_{non\_sib\_band}$ is a threshold value for non-sibilance frequency bands. In some embodiments, the threshold value is ten decibels ("dB"). In some embodiments, if I[n]=1, the sibilance detection module 130 determines that an impulsive sound is present. If I[n]=0, the sibilance detection module 130 determines that an impulsive sound is not present.

In some embodiments, the sibilance detection module 130 applies smoothing to the value output by Equation 7 prior to outputting the decision for whether an impulsive sound is detected. The logic of Equation 8 (below) exemplifies the smoothing operation:

$$I_{smooth}[n] = \begin{cases} \alpha_A I_{smooth}[n-1] + (1-\alpha_A)I[n], & \text{if } I[n] \geq I_{smooth}[n-1] \\ \alpha_R I_{smooth}[n-1] + (1-\alpha_R)I[n], & \text{otherwise} \end{cases} \quad \text{Equation 8}$$

where $\alpha_A$ is the attack time constant, which, in some embodiments, has a value of 0 seconds, and $\alpha_R$ is release time constant, which, in some embodiments, has a value of one second. Thus, $I_{smooth}[n]$ is the output of impulsive sound detector 132 (i.e., $R_{ISD}[n]=I_{smooth}[n]$).

In some embodiments, the attack time constant and the release time constant are adapted based on the type of impulsive sound. For example, one type of impulsive sound may be longer than another type of impulsive sound. In that case, the release time constant may be increased. In another example, a type of impulsive sound has lower energy in the beginning of the sound (e.g., below a threshold) thus, the attack time constant is be increased.

In some embodiments, the sibilance detection module 130 identifies the type of impulsive sound based on the time-frequency features. In some embodiments, the sibilance detection module 120 has access to known impulsive sounds and corresponding energy and/or flux levels. That is, a given sound may have a set of specific energy and/or flux levels in both the sibilance frequency bands and the non-sibilance frequency bands. In some embodiments, those energy levels and/or flux levels are stored and compared with the energy levels and/or flux levels of a detected impulsive sound. The comparison is repeated for all known impulsive sounds to identify the received impulsive sound.

In some embodiments, the sibilance detection module 130 identifies the type of impulsive sound based on the flux in the sibilance frequency bands and non-sibilance frequency bands using different thresholds for the sibilance the frequency bands and the non-sibilance frequency bands. For example, each known impulsive sound may be associated with a specific sibilance threshold and a specific non-sibilance threshold. Thus, impulsive sound type A may have a sibilance threshold of 15 dB and a non-sibilance threshold of 8 dB. Impulsive sound B may have a sibilance frequency band threshold of 20 dB and a non-sibilance threshold of 15 dB. Therefore, when flux values are calculated for both the sibilance frequency bands and the non-sibilance frequency bands, those flux values are compared with flux values for each known impulsive sound to determine which impulsive sound it is. For example, the closest sibilance and non-sibilance threshold matches may be used to determine the type of impulsive sound. The logic of Equation 9 (below) exemplifies impulsive sound detection.

Equation 9

Type =
$$\begin{cases} TypeA, & \text{if } S_{sib\_bands}[n] > Th_{sib\_bandA} \text{ and } S_{non\_sibs\_bands}[n] > Th_{non\_sib\_bandA} \\ TypeB, & \text{if } S_{sib\_bands}[n] > Th_{sib\_bandB} \text{ and } S_{non\_sibs\_bandB}[n] > Th_{non\_sib\_bandB} \end{cases}$$

where $S_{sib\_bands}[n]$ is a flux value for the sibilance frequency bands for time interval n (e.g., current frame), $Th_{sib\_bandA}$ is a threshold value for the sibilance frequency bands for Type A impulsive sound, $S_{non\_sib\_bands}[n]$ is the flux value for the non-sibilance frequency bands and $Th_{non\_sib\_bandA}$ is a threshold value for the non-sibilance frequency bands. In addition, $Th_{sib\_bandB}$ is a threshold value for the sibilance frequency bands for Type B impulsive sound and $Th_{non\_sib\_bandB}$ is a threshold value for the non-sibilance frequency bands for the Type B impulsive sound.

In some embodiments, the sibilance detection module 130 uses a counter to generate output from the impulsive sound detector 132. The logic of Equation 10 (below) exemplifies using a counter to generate the output from the impulsive sound detector 132:

Equation 10

$$I_{count}[n] = \begin{cases} N_{countdown}, & \text{if } I[n] = 1 \\ I_{count}[n-1]-1, & \text{if } I[n] = 0 \text{ and } I_{count}[n-1] > 0 \\ 0, & \text{otherwise} \end{cases}$$

where $N_{countdown}$ is a preset countdown value, n is the current time period (e.g., current frame). In some embodiments, the value is sample rate and frame size dependent. In some embodiments, the countdown duration equals to one second. The logic of Equation 11 (below) exemplifies output from the impulsive sound detector 132 using the countdown:

$$R_{ISD}[n] = \begin{cases} 1, & \text{if } I_{count}[n] > 0 \\ 0, & \text{otherwise} \end{cases} \quad \text{Equation 11}$$

where $I_{count}[n]$ is output of the counter of Equation 10.

In some embodiments, the sibilance detection module 130 uses a flat fricative voice detector 136 to determine whether the audio signal includes a flat fricative sound. In some embodiments, the flat fricative voice detector 136 includes both software and hardware components. In some embodiments, a short-term time-frequency features (e.g., ~5 milliseconds) are used to detect a flat fricative sound. Generally, flat fricative sound/speech has a flat spectrum compared with sibilance sounds (e.g., those with excessive or ear-piercing sibilance). In some embodiments, the sibilance spectral flatness is calculated by dividing the geometric mean of the power spectrum by the arithmetic mean of the power spectrum. Thus, flat fricative sounds can be detected based on sibilance spectral flatness measure ("SSFM"). In some embodiments, the sibilance detection module 130 uses Equation 12 (below) to calculate SSFM:

$$SSFM = \frac{\sqrt[k]{\prod_{1}^{K} X(k)}}{\frac{1}{K}\sum_{k=1}^{K} X(k)} \quad \text{Equation 12}$$

where X(k) is the sibilance voice frequency band spectrum of band index k, and K is the number of the frequency bands. In some embodiments, the sibilance detection module 120 uses variance and/or standard deviation of the power in adjacent sibilance frequency bands to determine whether a flat fricative sound is present. In some embodiments, the sibilance detection module 120 uses peak-to-average ratio or peak-to-median ratios of the power in sibilance frequency bands to determine whether a flat fricative sound is present. In yet some embodiments, the sibilance detection module 120 uses spectral entropy of the power in the sibilance frequency bands to determine whether a flat fricative sound is present. The logic of Equation 13 (below) illustrates the output of the flat fricative voice detector 136:

$$R_{FFVD}[n] = \begin{cases} 1, & SSFM[n] > Th_{SSFM} \\ 0, & \text{otherwise} \end{cases} \quad \text{Equation 13}$$

where $Th_{SSFM}$ is a threshold value for detection. Thus, if the output of the SSFM is greater than the threshold value, the sibilance detection module 130 determines that flat fricative sound is present.

Figure 4:
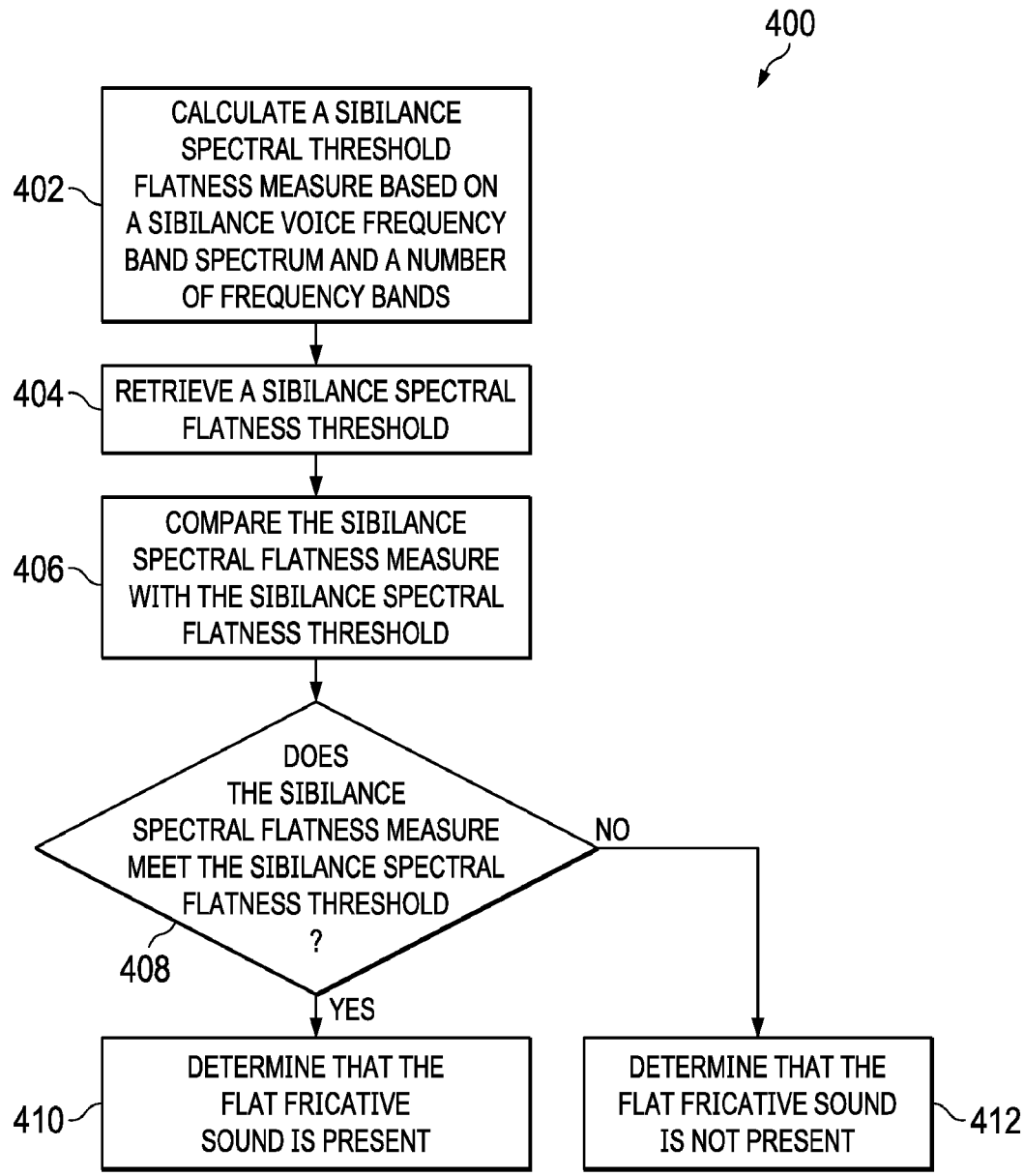
FIG. 4 illustrates actions that the sibilance detection module performs to detect a flat fricative sound, in accordance with some embodiments of the present disclosure.

FIG. 4 illustrates actions that the sibilance detection module 130 performs to detect a flat fricative sound. At 402, the sibilance detection module 130 calculates a sibilance spectral flatness measure based on a sibilance voice frequency band spectrum and a number of frequency bands. In some embodiments, the sibilance detection module 130 uses Equation 12 to perform the calculation. At 404, the sibilance detection module 130 retrieves (e.g., from memory as discussed in relation with FIG. 7) a sibilance spectral flatness threshold. At 406, the sibilance detection module 130 compares the sibilance spectral flatness measure with the sibilance spectral flatness threshold. At 408, the sibilance detection module 130 determines whether the sibilance spectral flatness measure meets the sibilance spectral flatness threshold. If the sibilance spectral flatness measure meets the sibilance spectral flatness threshold, process 400 moves to 410, where the sibilance detection module 130 determines that the flat fricative sound is present. If the sibilance spectral flatness measure does not meet the sibilance spectral flatness threshold, process 400 moves to 412, where the sibilance detection module 130 determines that the flat fricative sound is not present.

Returning to process 200 of FIG. 2, at 208, in accordance with determining mat me input signal includes the impulsive sound or flat the fricative sound, the sibilance detection module 130 adapts one or more parameters of sibilance detection for detecting sibilance in the audio signal. In some embodiments, at 208, the sibilance detection module adapts one or more parameters of sibilance detection for detecting sibilance in the audio signal based on output from the short-term feature detector 131. For example, the short-term feature detector can include one or more detectors (e.g., impulsive sound detector, flat fricative sound detector, and other suitable detectors). The output of the short-term feature detector 131 is input into the short-term sibilance detector 134. In some embodiments, the sibilance detection module 130 adapts a sibilance detection threshold based on the output value resulting from the determination of whether the impulsive sound was detected and the output value resulting from the determination of whether the flat fricative sound was detected. In yet some embodiments, the sibilance detection module 130 adapts a sibilance detection threshold based on the output of any suitable features of the short-term feature detector 131. The sibilance detection module 130 uses the sibilance detection threshold in short-term sibilance detection operation. Thus, at 210, the sibilance detection module 130 detects sibilance in the audio signal, using sibilance detection with the one or more adapted parameters.

As discussed above, the sibilance detection module includes a short-term sibilance detector 134. In some embodiments, the actions described above are performed by the short term sibilance detector 134. In those embodiments, the short-term sibilance detector 134 determines, using output from the impulsive sound detector 132, flat fricative voice detector 136, and/or any other component of the short-term feature detector 131, whether a type of sibilance is present that needs to be suppressed. The short-term sibilance detector 134 may be software, hardware or a combination of software and hardware. In some embodiments, the sibilance detection module 130 (e.g., using the short-term sibilance detector 134) calculates a spectrum balance feature, compares that spectrum balance feature to a threshold (e.g., threshold based on the output of the short-term feature detector including the impulsive sound detector 132, flat fricative voice detector 136, and/or any other suitable detector) to determine whether sibilance exists in the audio signal.

Herein, term "spectral balance" refers a balance property of signal energies over the voice frequency band. In some instances, spectral balance characterizes a balance degree of the signal energies over the whole voice frequency band. The term "voice frequency band" used herein means a frequency band in which a voice signal is located, and for example, ranges from approximately 0 kHz to approximately 16 kHz. Because sibilance has a special spectral distribution feature (i.e., the sibilance voice is generally concentrated on a certain frequency bands), the spectral balance feature is useful for discriminating between a non-sibilance voice and a sibilance voice.

In some embodiments, the spectral balance feature is obtained based on the signal energy in the sibilance frequency bands and the signal energy in a whole voice frequency band. Particularly, the spectral balance feature can be calculated as the ratio of the signal energy in the sibilance frequency bands to the signal energy in a whole voice frequency band. That is, the spectral balance feature can be represented as a ratio of the sum of the signal energies on all the sibilance frequency bands and the sum of the signal energies in the whole voice frequency band.

In some embodiments, the spectral balance feature is calculated based on the signal energy in a sibilance frequency bands and the signal energy in the non-sibilance frequency bands. In this instance, the voice frequency band is divided into two parts, the sibilance frequency bands and the non-sibilance frequency bands. That is, the bands are divided into two groups of bands, one that might contain signal energy of sibilance, and the other that does not or hardly contains signal energy of sibilance. Thus, the spectral balance feature is calculated as a ratio of the signal energies on the two frequency bands.

In some embodiments of the present disclosure, the spectral balance feature is of the present disclosure, the spectral balance feature is determined based on signal-to-noise ratios (SNR) in the sibilance frequency bands and the non-sibilance frequency bands. Particularly, the spectral balance feature is be determined as the ratio of the two SNRs.

In some embodiments, the sibilance detection module 130 uses the output of the short-term detector 131 (e.g., impulsive sound detector 132 and/or flat fricative voice detector 136) to calculate a threshold value for comparison with the spectral balance feature. In some embodiments, the sibilance detection module 130 uses the higher value of the output of the impulsive sound detector 132 and the output of the flat fricative sound detector 136. For example, if an impulsive sound was detected and the output from the impulsive sound detector 132 is one, but a flat fricative sound was not detected and the output from the flat fricative sound detector is zero, the sibilance detection module 130 uses the value one as input to the short-term sibilance detector 134). Therefore, in an embodiment, the sibilance detection module 130 uses Equation 14 (below) to determine the threshold value:

$$Th_{STSD}[n] = Th_{normal} + f(R_{FFVD}[n], R_{ISD}[n]) \cdot Th_{delta} \quad \text{Equation 14}$$

where $Th_{normal}$ is the normal threshold used when no impulsive sound or flat fricative sound is detected. In some embodiments, the threshold value is −5 dB. $Th_{delta}$ is the difference between normal threshold $Th_{normal}$ and a tight threshold $Th_{tight}$, where $Th_{tight}$ may have a value of −1 dB. In addition, $f(R_{FFVD}[n], R_{ISD}[n])$ may be $max(R_{FFVD}[n], R_{ISD}[n])$, where $R_{FFVD}[n]$ denotes an output value from the flat fricative sound detector 136, and $R_{ISD}[n]$ denotes an output value from the impulsive sound detector 132. That is, the max function is used to select the higher value. Although, Equation 14 determines a max value of the output of the impulsive sound detector 132 and the flat fricative voice detector 136, in some embodiments, the sibilance detection module determines a max value of output of any short-term feature detection.

In some embodiments, the function is more complex. For example, a weight can be given to out of each output of the short-term detector 131 (e.g., alternatively or additionally to the flat fricative sound detector 136 and impulsive sound detector 132). If a specific output of the short-term feature detector 131 is voice related and voice is detected in the portion of the audio signal that is being processed, a larger weight is given to that output. If a specific output of the short-term feature detector 131 is non-voice related and a voice is detected in the portion of the audio signal that is being processed, a smaller weight is given to that output. In some embodiments, $f(R_{FFVD}[n], R_{ISD}[n])$ is more complex. For example, more weight is given to the flat fricative voice detector 136 if the audio type is speech and more weight is given to the impulsive sound detector 132 if content is non-speech (e.g., music, sound effects, or another suitable sound). In an embodiment, the sibilance detection module 130 uses Equation 15 (below) to determine the value to add to Equation 14:

$$f(R_{FFVD}[n], R_{ISD}[n]) = w_{FFVD}[n] \cdot R_{FFVD}[n] + w_{ISD}[n] \cdot R_{ISD}[n] \quad \text{Equation 15}$$

where $w_{FFVD}[n]$ and $w_{ISD}[n]$ are the weights corresponding to the output of the flat fricative voice detector 136 and the output of impulsive sound detector 132, respectively. In some embodiments, the weights are determined based on the output from a content type classifier, (e.g., a neural network). Although, Equation 15 uses weights of the output of impulsive sound detector 132 and flat fricative voice detector 136, in some embodiments, the sibilance detection module can assign/use weights for output of any short-term feature detection. Thus, in some embodiments, Equation 15 can include results from other short-term feature detectors with associated weights.

In some embodiments, when the threshold value is determined, the sibilance detection module 130 uses the threshold value to determine if sibilance is present. In an embodiment, the sibilance detection module 130 uses the logic of Equation 16 (below) to make the determination.

$$R_{STSD}[n] = \begin{cases} 1, & \text{if } SPD[n] > Th_{STSD}[n] \\ 0, & \text{otherwise} \end{cases} \quad \text{Equation 16}$$

where $SPD[n]$ is the spectrum balance feature and $Th_{STSD}[n]$ is the threshold determined by, for example, Equation 14.

In some embodiments, the sibilance detection module 130 transfers the results of short-term sibilance detector 134 to multiband compressor 140. In some embodiments, the sibilance detection module 130 uses the results of short-term sibilance detector 134 to perform long-term sibilance detection (e.g., by using the long-term sibilance detector 138). In some embodiments, long-term sibilance detection is performed on a longer portion of the audio signal (e.g., around 200 milliseconds). In some embodiments, the sibilance detection module 130 uses the actions described in reference to FIG. 5 to further determine whether sibilance is present or not. These actions demonstrate just an example of long-term sibilance detection. In some embodiments, long-term sibilance detection is performed using a classifier (e.g., a neural network). For example, any detected short-term features and the appropriate audio signal portion can be used as input into the classifier (e.g., the classifier can be configured to take short-term features and a portion of the audio signal) and the output of the classifier is a determination of whether sibilance is present.

At 502, the sibilance detection module 130 accesses the output of the short-term sibilance detector 134. For example, the short-term sibilance detector 134 may be a function that outputs a value (e.g., one or zero) of whether sibilance is detected and also may output the spectrum balance feature discussed above. At 504, the sibilance detection module 130 selects a time constant based on whether the short-term sibilance detector 134 detected sibilance. In some embodiments, the constant is 0.2 seconds if sibilance is detected in the short-term sibilance detector 134 and one second if sibilance is not detected in the short-term sibilance detector 134.

At 506, the sibilance detection module 130 calculates a smoothed version of the spectrum balance feature using the selected time constant. In an embodiment, the sibilance detection module 130 uses logic of Equation 17 to make the calculations:

$$SPD_{smooth}[n] = \quad \text{Equation 17}$$

$$\begin{cases} \alpha_s SPD_{smooth}[n-1] + (1-\alpha_s)SPD[n], & R_{STSD}[n] = 1 \\ \alpha_{ns} SPD_{smooth}[n-1] + (1-\alpha_{ns})SPD[n], & \text{otherwise} \end{cases}$$

where $\alpha_s$ is the time constant used when sibilance is detected by short-term sibilance detector 134, i.e., $R_{STSD}[n]=1$, and $\alpha_{ns}$ is the time constant used when sibilance is not detected.

In some embodiments, the result of non-sibilance smoothed spectrum balance feature is given by Equation 18 (below):

$$R_{NSSSPD}[n] = f(SPD_{smooth}[n]) \quad \text{Equation 18}$$

where the $f(\cdot)$ is a comparison with a threshold. In an embodiment, the sibilance detection module 130 uses the logic of Equation 19 (below) for the calculation:

$$R_{NSSSPD}[n] = \begin{cases} 1, & \text{if } SPD_{smooth}[n] < Th_{NSSSPD} \\ 0, & \text{otherwise} \end{cases} \quad \text{Equation 19}$$

where $Th_{NSSSPD}$ is a threshold value (e.g., −12 dB).

In some embodiments, $f(\cdot)$ is a more complex function as show by Equation 20 (below):

$$R_{NSSSPD}[n] = \begin{cases} 1, & SPD_{smooth}[n] \leq Th_{NSSSPD1} \\ \dfrac{SPD_{smooth}[n] - Th_{NSSSPD1}}{Th_{NSSSPD2} - Th_{NSSSPD1}}, & Th_{NSSSPD1} < SPD_{smooth}[n] < Th_{NSSSPD2} \\ 0, & SPD_{smooth}[n] \geq Th_{NSSSPD2} \end{cases} \quad \text{Equation 20}$$

where $Th_{NSSSPD1}$ and $Th_{NSSSPD2}$ are thresholds (e.g., with values of −15 dB and −12 dB respectively) and $SPD_{smooth}[n]$ is a smoothed version of the spectrum balance feature.

Figure 5:
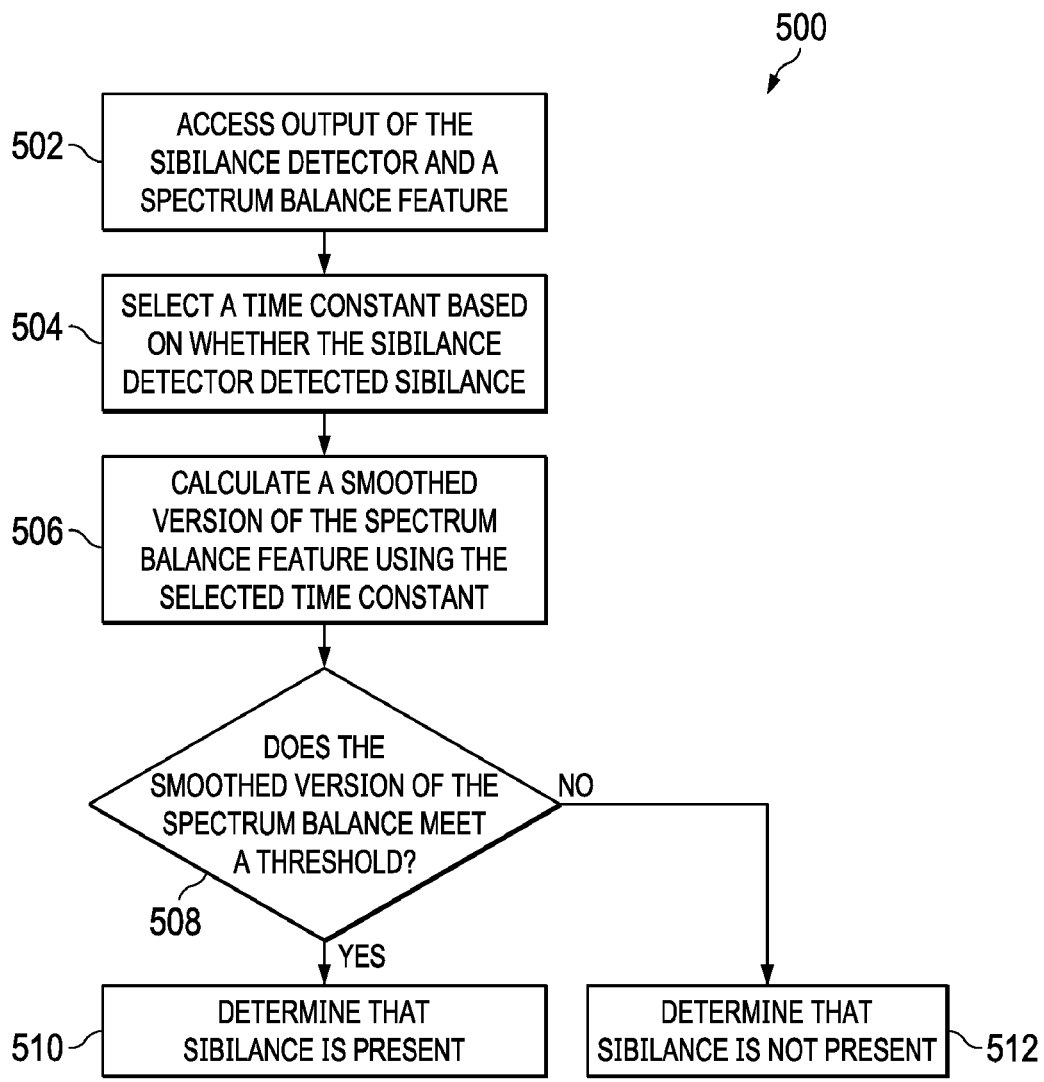
FIG. 5 illustrates actions to further determine whether sibilance is present, in accordance with some embodiments of the present disclosure.

To continue with process 500 of FIG. 5, at 508 the sibilance detection module 130 determines whether the smoothed version of the spectrum balance feature meets a threshold. In some embodiments, as described in relation to Equation 20, the sibilance detection module 130 determines whether the spectrum balance feature meets multiple thresholds. If the smoothed version of the spectrum balance feature meets a threshold, process 500 moves to 510, where the sibilance detection module 130 determines that sibilance is present. If the smoothed version of the spectrum balance feature does not meet the threshold, process 500 moves to 512, where the sibilance detection module 130 determines that sibilance is not present.

In some embodiments, the output of the long-term sibilance detector 138 includes the results of both the short-term sibilance detection and the long-term sibilance detection. In some embodiments, the sibilance detection module 130 uses a function to determine the output of the long-term sibilance detector 138. In an embodiment, the output is as shown by Equation 21:

$$R_{LTSD}[n] = f(R_{STSD}[n], R_{NSSSPD}[n]) \quad \text{Equation 21}$$

where $R_{STSD}[n]$ and $R_{NSSSPD}[n]$ are outputs from the short-term sibilance detector 134 and the long-term sibilance detector 138, respectively. In Equation 21, $f(\bullet)$ is a product of $R_{STSD}[n]$ and $R_{NSSSPD}[n]$, for example.

In some embodiments, the output of the short-term, long-term or both of short-term and long sibilance detection is used for sibilance suppression. However, a person skilled in the art would understand that sibilance suppression is just an example of use of detected sibilance. For example, the sibilance detection module 130 may use the output to control the multiband compressor 140. Thus, the thresholds of the multiband compressor 140 are adjusted dynamically to suppress sibilance in the audio signal. In some embodiments, Equation 21 (below) is used in sibilance suppression:

$$Th_k[n] = Th\_static_k + a_k R_{LTSD}[n] \quad \text{Equation 21}$$

where k is in the sibilance frequency band of the multiband compressor 140 (e.g., 4 kHz-10 kHz), $Th\_static_k$ is the static threshold of band k, and $a_k$ is the dynamic adjustment value of band k. In some embodiments, the dynamic adjustment is the same across all sibilance frequency bands. In some embodiments, the dynamic adjustment is different for some sibilance frequency bands. The dynamic adjustment includes preset values, a tunable parameter, or another suitable dynamic adjustment. The tunable parameters may be used to accommodate various characteristics of devices (e.g., mobile devices).

In some embodiments, the sibilance detection module 130 adapts the one or more parameters of a sibilance detector based on a combination of the short-term and long-term features. The sibilance detection module 130 determines the one or more short-term features (e.g., an impulsive sound, a flat fricative sound, or another suitable feature). The sibilance detection module 130 determines, based on the one or more short-term features, the one or more long-term features. For example, the sibilance detection module 130 takes the output of the short-term feature detector and uses that output as input to the long-term feature detector, as described above. The sibilance detection module then adapts the one or more sibilance parameters based on a combination of the short-term features and the long-term features. For example, the sibilance detection module 130 changes sibilance thresholds, as described above, based on the long-term sibilance features as determined using output of the short-term sibilance features or using output of the transform module 110 and/or the banding module 120.

In some embodiments, the sibilance detection module uses a machine learning based classifier (e.g., a neural network) to determine the presence of sibilance. In these embodiments, the sibilance detection module 130 uses a combination of any of the output of the short-term feature detector 131 (including impulsive sound detector 132, flat fricative voice detector 136, and/or any other short-term feature detector), short-term sibilance detector 134 and the long-term sibilance detector 138 as input into a machine learning based classifier. The machine learning based classifier can be trained to output a determination of whether sibilance is present based on that information.

Figure 6:
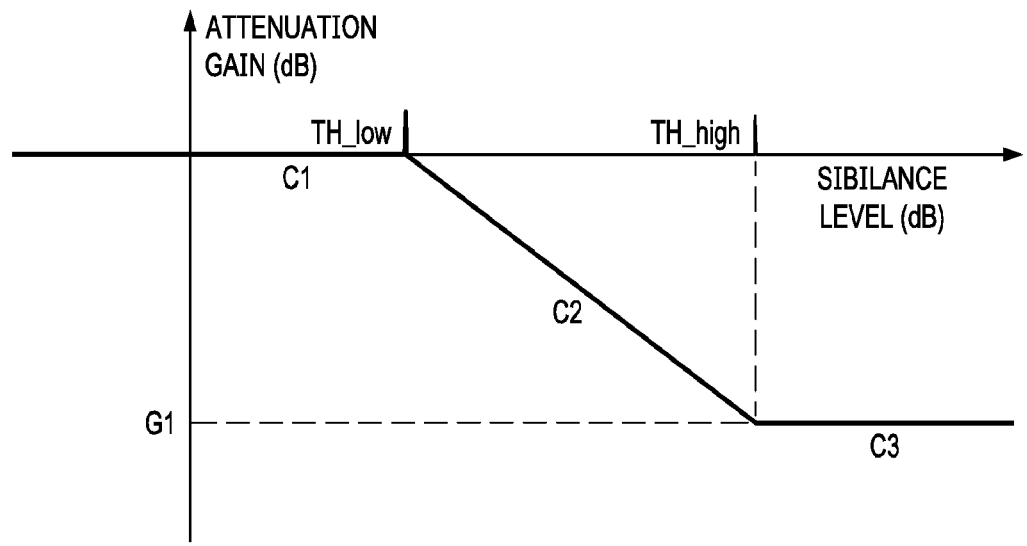
FIG. 6 illustrates a sibilance suppression curve that may be used in sibilance suppression, in accordance with some embodiments of the present disclosure.

FIG. 6 illustrates a sibilance suppression curve that may be used in sibilance suppression. The sibilance suppression curve includes three parts C1, C2 and C3. In part C1, the level of sibilance is lower than the low threshold TH_low, and thus the attenuation gain for sibilance suppression will be 0 dB, which means no processing will be done to suppress non-sibilant sounds and non-sibilant sounds. In part C2, the level of sibilance falls within the range between TH-Low and TH-high, and thus a linear suppression may be triggered. In part C3, the level of sibilance is higher than the high threshold TH_high, and the attenuation gain for sibilance suppression is set as G1, which is the maximum sibilance suppression depth of the system.

Figure 7:
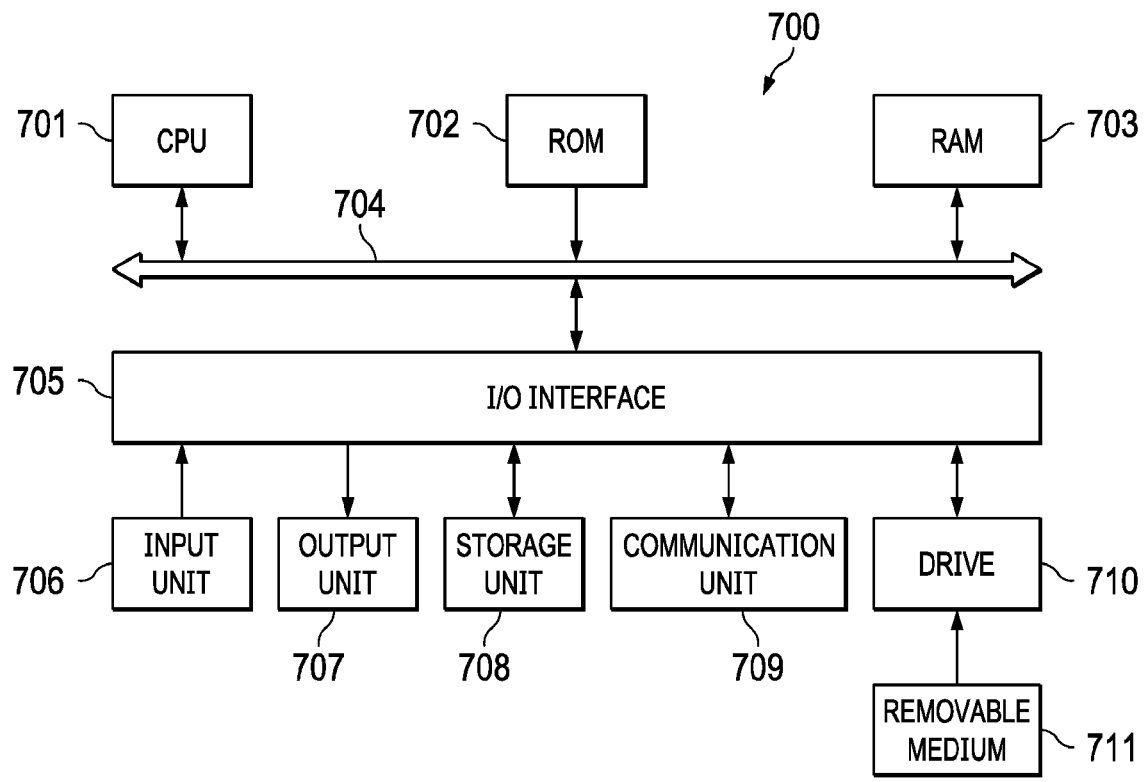
FIG. 7 is a block diagram for implementing sibilance detection, in accordance with some embodiments of the present disclosure.

FIG. 7 shows a block diagram of an example system 700 suitable for implementing example embodiments of the present disclosure. As shown, the system 700 includes a central processing unit (CPU) 701 which is capable of performing various processes in accordance with a program stored in, for example, a read only memory (ROM) 702 or a program loaded from, for example, a storage unit 708 to a random access memory (RAM) 703. In the RAM 703, the data required when the CPU 701 performs the various processes is also stored, as required. The CPU 701, the ROM 702 and the RAM 703 are connected to one another via a bus 704. An input/output (I/O) interface 705 is also connected to the bus 704.

The following components are connected to the I/O interface 705: an input unit 706, that may include a keyboard, a mouse, or the like; an output unit 707 that may include a display such as a liquid crystal display (LCD) and one or more speakers; the storage unit 708 including a hard disk, or another suitable storage device; and a communication unit 709 including a network interface card such as a network card (e.g., wired or wireless). The communication unit 709 is configured to communicate with other devices (e.g., via a network). A drive 710 is also connected to the I/O interface 705, as required. A removable medium 711, such as a magnetic disk, an optical disk, a magneto-optical disk, a flash drive or another suitable removable medium is mounted on the drive 710, so that a computer program read therefrom is installed into the storage unit 708, as required. A person skilled in the art would understand that although the system 700 is described as including the above-described components, in real applications, it is possible to add, remove, and/or replace some of these components and all these modifications or alteration all fall within the scope of the present disclosure.

In accordance with example embodiments of the present disclosure, the processes described above may be implemented as computer software programs. For example, embodiments of the present disclosure include a computer program product including a computer program tangibly embodied on a machine readable medium, the computer program including program code for performing methods. In such embodiments, the computer program may be downloaded and mounted from the network via the communication unit 709, and/or installed from the removable medium 711.

Generally, various example embodiments of the present disclosure may be implemented in hardware or special purpose circuits (e.g., control circuitry), software, logic or any combination thereof. For example, the sibilance detection module 130 may be executed by the control circuitry (e.g., a CPU in combination with other components of FIG. 7), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

What is claimed is:

1. A method comprising:
   receiving an audio signal;
   determining whether a current portion of the audio signal comprises speech or non-speech;
   extracting from the audio signal a plurality of time-frequency features, the plurality of time-frequency features comprising one or more short-term features;
   determining whether an impulsive sound is present in the extracted one or more short-term features;
   in accordance with determining that non-speech is present in the current portion of the audio signal, adapting one or more thresholds of a sibilance detector to a first set of one or more threshold values, the adapting including giving a first weight to a first output value resulting from the determination of whether the impulsive sound is present;
   in accordance with determining that speech is present in the current portion of the audio signal, adapting the one or more thresholds of the sibilance detector to a second set of one or more threshold values different than the first set of one or more threshold values, the adapting including giving a second weight to the first output value resulting from the determination of whether the impulsive sound is present;
   detecting sibilance in the audio signal, using the sibilance detector with the one or more adapted thresholds; and
   suppressing the sibilance in the audio signal by applying to the audio signal one or more gains determined in response to the sibilance in the audio signal.

2. The method of claim 1, wherein a flat fricative sound is detected from the one or more short-term features;
   the flat fricative sound is a fricative sound with a flat spectrum; and
   the method further comprises, in accordance with a second output value from a determination whether the flat fricative sound was detected, adapting the one or more thresholds of the sibilance detector for detecting the sibilance in the audio signal.

3. The method of claim 1, wherein the plurality of time-frequency features comprises long-term features; and
   the method further comprises, in accordance with the extracted long-term features, adapting the one or more thresholds of the sibilance detector for detecting the sibilance in the audio signal.

4. The method of claim 3, wherein the long-term features include a smoothed audio spectrum balance feature.

5. The method of claim 1, wherein adapting the one or more thresholds of the sibilance detector comprises generating a control signal that includes a value resulting from a short-term feature detection.

6. The method of claim 1, wherein adapting the one or more thresholds of a sibilance detector comprises
determining the one or more short-term features;
determining the one or more long-term features; and
adapting the one or more thresholds of the sibilance detector based on a combination of the one or more short-term features and the one or more long-term features.

7. The method of claim 1, wherein detecting determining the impulsive sound from the one or more short-term features comprises:
calculating, for a first time interval in the audio signal, a first total power in one or more sibilance frequency bands and a second total power in one or more non-sibilance frequency bands;
calculating, for a second time interval in the audio signal, a third total power in the one or more sibilance frequency bands and a fourth total power in the one or more non-sibilance frequency bands;
determining a first flux value based on a difference between the first total power and the third total power, and a second flux value based on a difference between the second total power and the fourth total power; and
determining whether the impulsive sound is present based on whether the first flux value meets a first threshold value and the second flux value meets a second threshold value.

8. The method of claim 7, further comprising
applying a smoothing algorithm to the first output value.

9. The method of claim 8, wherein applying the smoothing algorithm to the first output value comprises using an attack time constant and a release time constant.

10. The method of claim 9, further comprising adapting the attack time constant or the release time constant based on a type of the impulsive sound.

11. The method of claim 10, further comprising determining the type of the impulsive sound based on the plurality of time-frequency features.

12. The method of claim 11, wherein determining the type of impulsive sound comprises:
comparing data for sibilance frequency bands and non-sibilance frequency bands with corresponding frequency band data for a plurality of known impulsive sounds; and
identifying the impulsive sound based on the comparing.

13. The method of claim 2, wherein determining, using the one or more short-term features, whether the audio signal includes the flat fricative sound comprises:
calculating a sibilance spectral flatness measure based on a sibilance voice frequency band spectrum and a number of frequency bands.

14. The method of claim 2, wherein determining, using the one or more short-term features, whether the audio signal includes the flat fricative sound comprises:
calculating a variance in power of adjacent sibilance frequency bands.

15. The method of claim 2, wherein determining, using the one or more short-term features, whether the audio signal includes the flat fricative sound comprises:
calculating a peak-to-average ratio or peak-to-median ratio of power in sibilance frequency bands.

16. The method of claim 2, wherein determining, using the one or more short-term features, whether the audio signal includes the flat fricative sound comprises:
calculating a spectral entropy measure in sibilance frequency bands.

17. The method of claim 2, wherein adapting the one or more thresholds of a sibilance detector for detecting the sibilance in the audio signal comprises adapting a sibilance detection threshold based on the first output value resulting from the determination of whether the impulsive sound was detected and the second output value resulting from a determination of whether the flat fricative sound was detected.

18. The method of claim 17, wherein the adapting of the one or more thresholds of the sibilance detector comprises:
in response to determining that the current portion of the audio signal comprises non-speech giving the first weight to the first output value resulting from the determination of whether the impulsive sound was detected, and giving a second third weight, lower than the first weight, to the second output value resulting from the determination of whether the flat fricative sound was detected; and
in response to determining that the current portion of the audio signal comprises speech, giving the second weight to the first output value resulting from the determination of whether the impulsive sound was detected, and giving a fourth weight, higher than the second weight, to the second output value resulting from the determination of whether the flat fricative sound was detected.

19. The method of claim 1, further comprising:
accessing output of the sibilance detector and a spectrum balance value;
selecting a time constant based on whether the sibilance detector detected the sibilance;
calculating a smoothed version of the spectrum balance value using the selected time constant;
comparing the smoothed version of the spectrum balance with a threshold of the one or more thresholds of the sibilance detector; and
determining, based on comparing the smoothed version of the spectrum balance with a threshold, whether the sibilance is present.

20. A system comprising:
one or more computer processors; and
one or more non-transitory storage media storing instructions which, when executed by the one or more computer processors, cause performance of the method recited in claim 1.

* * * * *